United States Patent [19]

Layton et al.

[11] Patent Number: 4,575,299

[45] Date of Patent: Mar. 11, 1986

[54] AUTOMATED WORK TRANSFER SYSTEM FOR CHEMICAL PROCESSING BATHS

[75] Inventors: Howard M. Layton, New Fairfield, Conn.; Kenneth Yocis, Carmel, N.Y.

[73] Assignee: Interlab, Inc., Danbury, Conn.

[21] Appl. No.: 664,299

[22] Filed: Oct. 24, 1984

[51] Int. Cl.$^4$ .......................................... B65G 49/04
[52] U.S. Cl. ................... 414/222; 414/750; 134/76; 134/82
[58] Field of Search ............. 134/61, 76, 82, 85, 134/137, 140; 414/222, 750; 901/6, 21; 212/205, 210, 211, 225, 226, 227, 228, 257; 198/342

[56] References Cited

U.S. PATENT DOCUMENTS

| | | | |
|---|---|---|---|
| 2,861,701 | 11/1958 | Bergsland | 901/21 X |
| 3,335,839 | 8/1967 | Neumann | 134/76 X |
| 3,658,197 | 4/1972 | DiDonato | 414/222 X |
| 3,691,988 | 9/1972 | Clarke | 414/750 X |
| 4,063,651 | 12/1977 | Chino | 134/76 X |
| 4,377,986 | 3/1983 | Juve | 134/76 X |
| 4,466,454 | 8/1984 | Layton | 134/76 |
| 4,493,333 | 1/1985 | Layton | 134/82 X |

FOREIGN PATENT DOCUMENTS

| | | | |
|---|---|---|---|
| 53-25787 | 3/1978 | Japan | 415/750 |
| 474435 | 9/1975 | U.S.S.R. | 901/6 |

*Primary Examiner*—Philip R. Coe
*Assistant Examiner*—Frankie L. Stinson
*Attorney, Agent, or Firm*—Michael Ebert

[57] ABSTRACT

A work transfer system conveying a work basket in a programmed sequence to the processing tanks of an assembly thereof placed at various positions on a work bench. The system acts to transfer the basket to a selected tank and to properly orient the basket with respect to this tank before lowering the basket therein for processing during a given dwell period, at the conclusion of which the basket is hoisted from the tank and transferred to another tank where the procedure is repeated. Running along the front of the bench is a rail on which a robot is driven to a position in the proximity of the selected tank, the robot supporting a hoist which can be raised or lowered. Cantilevered from the hoist and extending transversely across the bench is a hollow arm having a trolley therein provided with a turntable whose spindle projects upwardly to join the upper end of a loop which encircles the arm, the loop being provided at its lower end with a hand that engages the work basket. The trolley is driven fore or aft to carry the hand to a position generally in line with the selected tank therebelow. The turntable is driven to angle the loop relative to the arm and hence the hand, so as to properly orient the basket with respect to the selected tank.

10 Claims, 6 Drawing Figures

AUTOMATED WORK TRANSFER SYSTEM FOR CHEMICAL PROCESSING BATHS

BACKGROUND OF INVENTION

1. Field of Invention:

This invention relates generally to work transfer systems, and more particularly to an automated system in which a robot running on a rail along the front of a work bench having an assembly of processing tanks at various positions thereon, acts to convey a work basket in a programmed sequence to each of the tanks, the robot acting to properly position and orient the work basket with respect to each tank before the basket is immersed therein.

2. Prior Art:

By using diffusion techniques it is now possible to fabricate transistors and diodes as well as resistors and capacitors within a single wafer of silicon to create integrated circuits. The manufacture of microelectronic devices entails sequences of photolithograaphy, etching and critical cleaning processes. For the most part, these have heretofore been carried out manually at wet chemistry work benches.

In the usual manufacturing procedure, batches of substrates or silicon wafers are carried in "boats" and transferred from one chemical bath or tank to another by a human operator who adjusts the conditions prevailing in each tank and also determines the periods during which the boat dwells in the respective tanks for treatment therein. Typically, the work bench arrangement is such that one or sometimes two rows of chemical and rinsing tanks are provided and in which the various processing baths are not usually in accurate alignment with respect to each other and in fact may be randomly placed.

The chemical and rinsing baths are generally accommodated in a console which also incorporates a clean air environment. To avoid contamination of the work being processed, the basket holding the workpieces are manually transferred by the operator from one chemical or rinsing bath to another from left to right on the work bench, or fore and aft depending on the placement of the tanks, in a timed sequence dictated by the processing procedures appropriate to the work pieces being handled.

To carry out this timed sequence, the operator must from time to time reach into the clean environment and across various processing baths in response to bells and buzzers timing the process. This manual procedure gives rise to a margin of human error in the timing of any one process or in the processing sequence, and it also may result in contamination of the work pieces. The need exists, therefore, for an automated system to transfer work pieces from one chemical bath to another by precisely controlled mechanisms which dispense with human operators.

While automated transfer operations are now commonplace in many industrial processes including electroplating, a number of practical factors have heretofore militated against the introduction of automation in the processing of microelectronic devices. A major factor is that the value of the microelectronic devices is high relative to the cost of labor involved in making these parts. Thus the introduction of automated work transfer mechanisms to reduce labor costs may not be economically justified particularly when one takes into account the capital investment dictated by automated equipment.

But other factors now come into play which have little to do with the cost effectiveness of replacing manual operations with automated work transfer mechanisms. As microelectronic devices become increasingly complex and sophisticated, the associated wet chemistry procedures are rendered even more critical. As a consequence, the variables and human errors incidental to manual operation can no longer be tolerated, for repeatability and consistency are now the primary desiderata. Hence, these considerations may override the cost effectiveness factor.

Though efforts have been made to automate work transfer operations in wet chemistry processing of microelectronic devices, they have had limited success, largely because of certain environmental problems. Many of the chemical processing tanks used in micro device and wafer processing act to discharge corrosive vapors into the work area in the region immediately above the process tanks. Since the hoist is for the most part required to operate within this corrosive environment, freely moving, unanchored hoist type of work transfer mechanisms such as are employed in the printed circuit boart plating industry have not been readily adaptable to this quite different and specialized type of use.

Instead, use has been made of fixed-sequence transfer mechanisms. These enjoy the advantage of lesser vulnerability to the corrosive environment by reason of the reduced complexity of these parts of the mechanism which are exposed to the environment. However, they suffer from the limitation that work transfer takes place only between two immediately adjacent tanks. In general, a single, commcn processing cycle time must be used.

As a consequence, the corrosive nature of the environment associated with many of the wet chemistry processes in microelectronic device and wafer fabrication has hitherto tended to discourage the use of an unanchored, horizontally-free tracking hoist or robot in this industry.

The Layton U.S. Pat. No. 466,454 (1984) discloses a work transfer system in which a robot is provided having a hand adapted to grasp the handle of the work basket and to manipulate the basket in accordance with programmed instructions, whereby the basket may be made to carry work in any desired sequence along a row of processing tanks disposed on a work bench. In this system, the entire transfer mechanism, but for the robot hand and its supporting arms, lies outside of the corrosive environment and need not, therefore, be protected against corrosion.

In this prior system, a rail is disposed adjacent the front of the work bench in parallel relation to the uniform row of tanks thereon. Riding the rail is a robot having a pair of vertical shafts extending upwardly therefrom, the shafts being supported on an elevator platform disposed within this robot. A pair of arms cantilevered from the upper ends of these shafts extends over the work bench, the extremities of these arms being pivotally connected to a cross piece from whose center depends a rod terminating in a hand adapted to engage the work basket handle.

In operation, when the robot is instructed to carry the work basket to a selected tank, the robot is caused to travel on the rail to a position at which the hand and the basket borne thereby are in general alignment with this tank. Concurrently, the shafts are rotated to angle the cross piece and thereby turn the rod carrying the hand to orient the work basket so that it is properly oriented with respect to the selected tank therebelow. And by then operating the robot elevator, the work basket is lowwered into the tank for processing, the basket being thereafter lifted from the tank so that the basket can then be transferred to another processing tank on the work bench.

There are, however, some work bench tank set-ups for which the prior system disclosed in the Layton patent is unsuited. Thus, where instead of a uniform orientation of tanks as shown in this patent, there may be more than one orientation of such tanks on the bench. In a situation in which the tanks are randomly dispersed or are not oriented in the same direction, the complex motions then required of the work transfer system to properly position and orient the basket with respect to a given tank cannot be executed by the prior system disclosed in the Layton patent.

SUMMARY OF INVENTION

In view of the foregoing, the main object of this invention is to provide an improved automated work transfer system for conveying a basket carrying work over a work bench having an assembly of processing tanks at diverse positions and having diverse orientation.

While the invention will be described in the context of a corrosion-resistant system which includes a robot operating outside of the corrosive environment, it will be appreciated that a similar transfer mechanism may be used in other applications not involving a corrosive environment.

More specifically, an object of the invention is to provide a system of the above type in which fore and aft movement of the work basket as well as angular adjustment thereof are made possible in addition to movement in the horizontal and vertical directions, so that the system is capable of properly locating the basket with respect to any tank in the assembly, regardless of its position and orientation on the work bench.

Also an object of this invention is to provide a system of the above type which operates efficiently and reliably, and which can be manufactured at relatively low cost.

Briefly stated, these objects are attained in a work transfer system conveying a work basket in a programmed sequence to the processing tanks of an assembly thereof placed at various positions on a work bench. The system acts to transfer the basket to a selected tank and to properly orient the basket with respect to this tank before lowering the basket therein for processing during a given dwell period, at the conclusion of which the basket is hoisted from the tank and transferred to another tank where the procedure is repeated. Running along the front of the bench is a rail on which a robot is driven to a position in the proximity of the selected tank, the robot supporting a hoist which can be raised or lowered. Cantilevered from the hoist and extending transversely across the bench is a hollow arm having a trolley therein provided with a turntable whose spindle projects upwardly to join the upper end of a loop which encircles the arm, the loop being provided at its lower end with a hand that engages the work basket. The trolley is driven fore or aft to carry the hand to a position generally in line with the selected tank therebelow. The turntable is driven to angle the loop relative to the arm and hence the hand, so as to properly orient the basket with respect to the selected tank.

A system in accordance with the invention effects automatic positioning in the following four distinct modes:

I. A shift in robot position on the rail along a longitudinal axis parallel to the front of the work bench to a position in the proximity of a selected tank;

II. A raising or lowering of the hoist carried by the robot to effect immersion of the work basket in a selected tank and its removal therefrom;

III. A shift in the position of the hand cantilevered from the hoist in the fore or aft direction along an axis transverse to the longitudinal rail axis to a position directly above the selected tank; and IV. A rotation of the hand to angle it with respect to the transverse axis, to thereby properly orient the basket held by the hand with respect to the selected tank.

OUTLINE OF DRAWINGS

For a better understanding of the invention as well as other objects and further features thereof, reference is made to the following detailed description to be read in conjunction with the accompanying drawings, wherein:

FIG. 5 is a separate view, in perspective, of the trolley which operates within the cantilevered arm.

DESCRIPTION OF INVENTION

Figure 1:
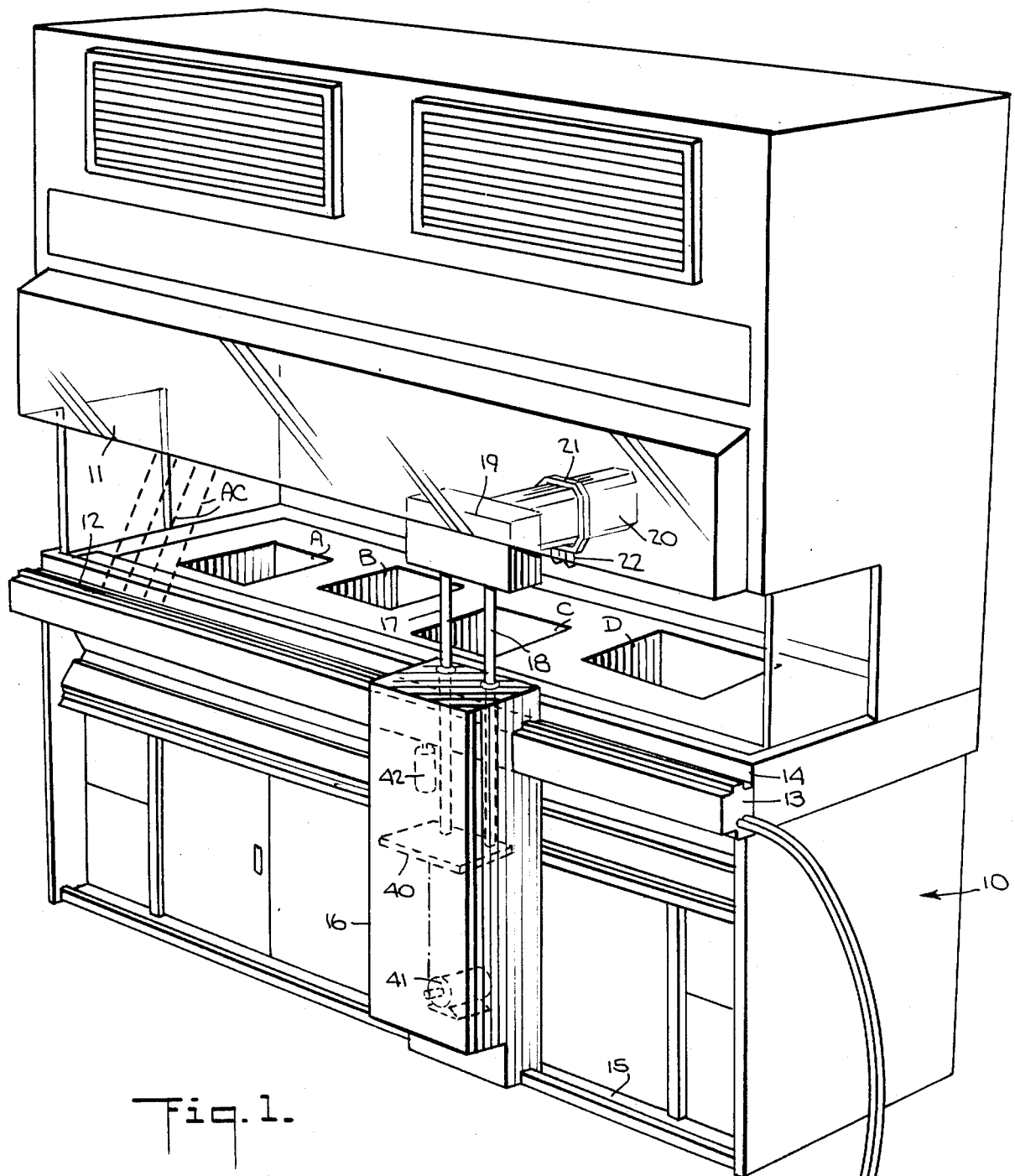
FIG. 1 is a perspective view of a typical wet chemistry work station which incorporates an automated work transfer system having a robot in accordance with the invention.

The General Arrangement:

Referring now to FIG. 1, there is shown a wet chemistry work station provided with a work bench 10 of conventional design having an assembly of chemical processing tanks A, B, C, and D, each tank being adapted to receive the basket carrying work to be processed. The number of tanks, nature of the chemical processing and its operating sequence form no part of the present invention.

Because of vapors emitted from the tanks, the atmosphere in the region above the tanks is corrosive. This region is isolated from the external environment by a vertical air curtain AC created by a high velocity laminar air stream projecting downwardly from a transparent front hood 11 into an exhaust slot 12 extending along the front of the bench. This air curtain effectively isolates the contaminated work environment from the external environment.

The invention is operable with any isolating air curtain such as that existing in a typical fume exhaust hood in which openings and the rear of the work station have the effect of drawing all air from the work environment into rear exhaust slots and ducts, this air in turn being replaced by a stream of air drawn from in front of the station to create an air curtain thereacross.

The system includes a supporting rail 13 secured to the upper edge 14 on the front side of the work bench so that the rail is outside air curtain AC and is laterally displaced from the assembly of tanks, the rail running parallel to the front side. Mounted against the front lower edge of the work bench is a guide rail 15.

Riding along these rails is a robot 16 which is fully encased but for a pair of hoisting posts 17 and 18 held in slide bearings and extending above the top of the robot to support a hoist 19. Cantilevered from hoist 19 is a hollow arm 20 encircled by an angularly adjustable loop 21 from which a hand 22 depends to grasp the handle of a work basket WB. Loop 21 is in generally rectangular form and is constituted by upper and lower side branches joined together at the corners by angled corner pieces. Posts 17 and 18 are anchored within the robot on an elevator platform 40 operated by an elevator motor 41 which acts to raise or lower the hoist. A separate motor 42 on the robot acts to advance robot 16 along its supporting rail 13 to bring hand 22 in general alignment with a selected tank on the work bench.

Figure 2:
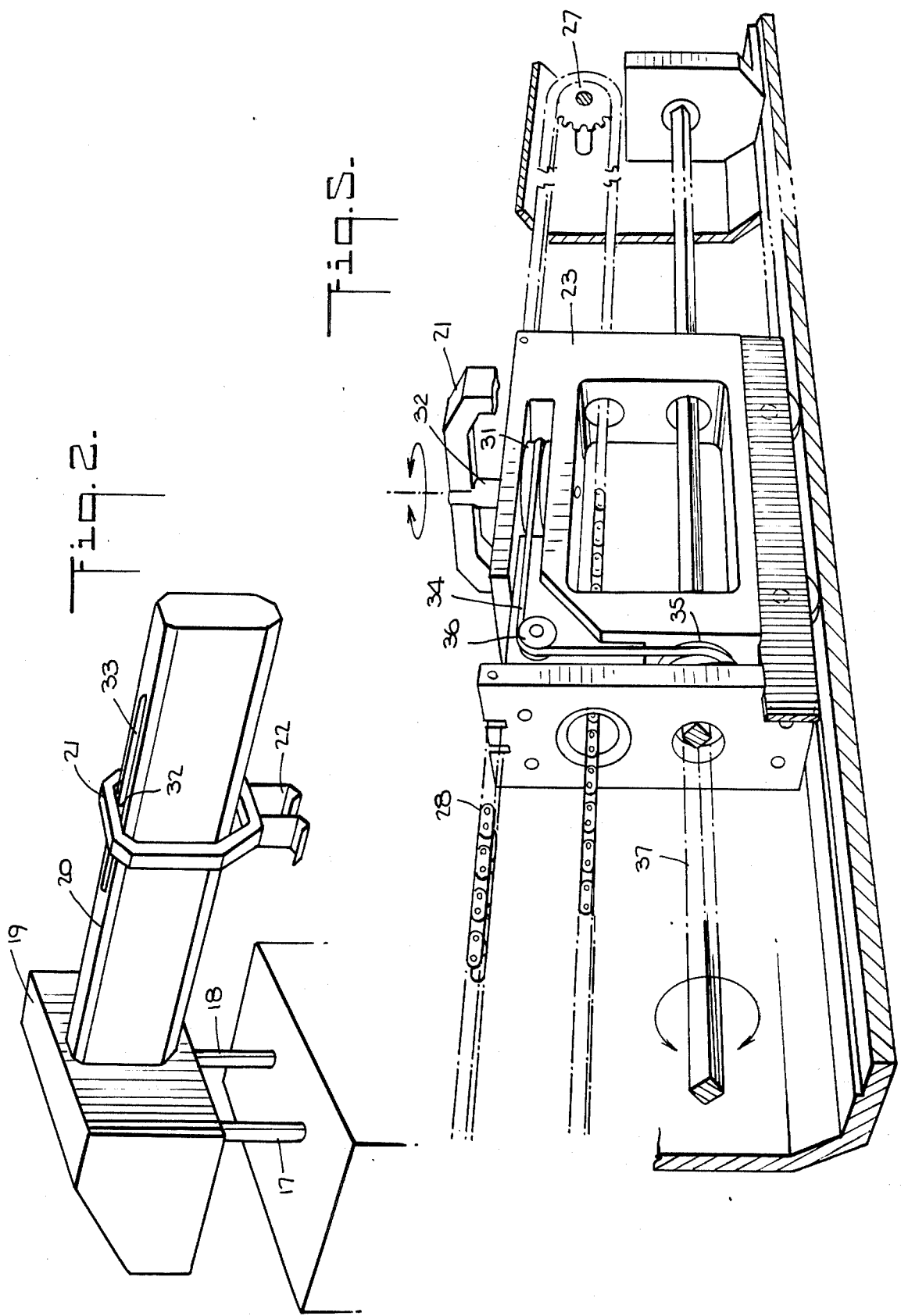
FIG. 2 is a perspective view of the hoist associated with the robot and the cantilevered arm.

As best seen in FIG. 2, cantilever arm 20 has a thin cross section and a smooth, contoured outer skin to minimize air turbulence around the arm. In the typical chemical processing console, proper working conditions are maintained by a laminar air flow of clean air, and it is important, therefore, that the arm extending into this environment not disrupt this flow and create turbulence. Because the housing skin encloses all of the working mechanisms disposed within the hollow arm, particulate matter generated by this mechanism is contained therein.

Hoist 19 is outside the environment above the work bench, whereas arm 20 extends into this environment which may be corrosive. Hence all operating mechanisms housed within the arm are preferably made of corrosion-resistant plastics or other materials impervious to the vapors emanating from the various chemical baths that may seep into the arm housing.

Figure 3:
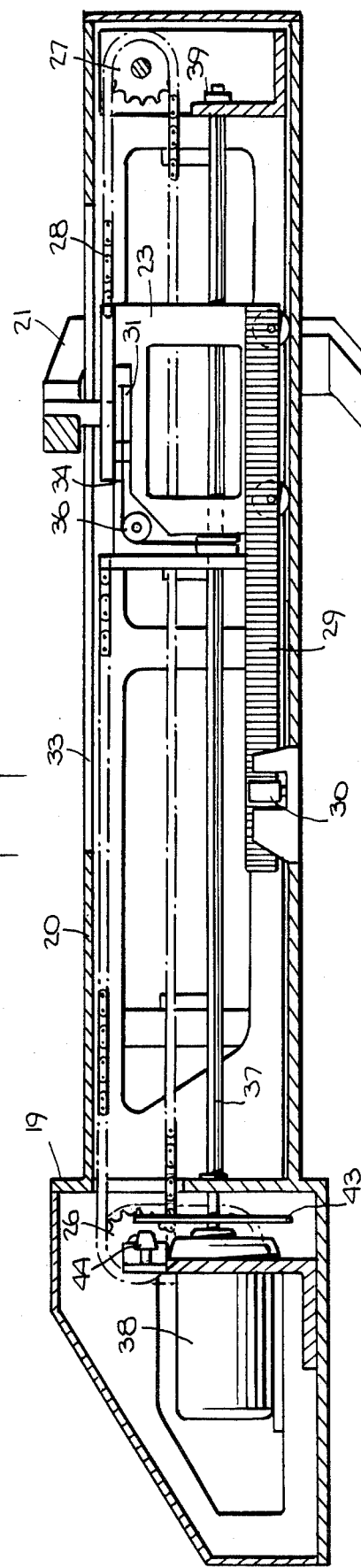
FIG. 3 is a longitudinal section taken through FIG. 2.
Figure 4:
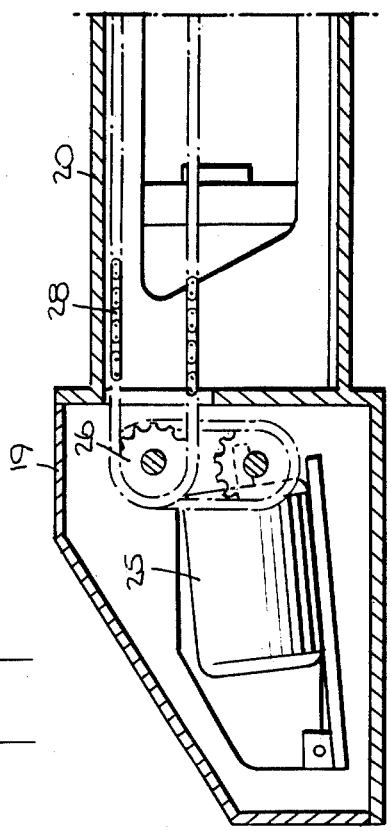
FIG. 4 is another section taken through the hoist to show the second drive motor therein.

Disposed within hollow arm 20, as shown in FIGS. 3, 4 and 5, is a trolley 23 whose wheels ride on a trackway along the base of the arm. The trolley runs in either a fore or aft direction which is along a transverse axis at right angles to the horizontal rail axis along which the robot runs.

Placed within the housing of hoist 19 is a trolley drive motor 25 operatively coupled by a belt to a drive sprocket wheel 26. Extending between this wheel and an idler sprocket wheel 27 at the far end of arm 20 is an endless sprocket chain 28 that is linked to trolley 23 so that the trolley is pulled in either direction by the chain.

The position of trolley 23 on the arm trackway indicated by a linear encoder strip 29, which is attached and travels with the trolley, the encoder strip moving past a fixed sensor 30 which produces a signal indicative of the trolley position. In practice, encoder 29 is provided with a row of equi-spaced bars that are detected magnetically or electro-optically by the sensor to produce a counting pulse each time a bar goes by the sensor. Thus, the greater the pulse count from the sensor, the greater the trolley displacement from its start position.

The digital output of the sensor is applied to a computer which controls the operation of the trolley drive motor to arrest the motor when the trolley occupies the desired position dictated by the computer program for the processing procedure.

Mounted on a bearing within trolley 23 is a turntable 31 having an upright center spindle 32. This spindle projects through a longitudinal slot 33 in the upper side of the arm 20 and is joined to the upper branch of loop 21, the hand 22 being attached to the lower branch thereof.

The extent to which trolley 23 is permitted to travel in the fore and aft direction is limited by the length of slot 33 which is long enough to permit the trolley to carry the hand to a position locating the work basket above any selected tank in the assembly thereof on the work bench.

Turntable 31 is driven peripherally by means of an endless belt 34 which couples the turntable to a drive pulley 35 mounted for rotation on the front wall of the trolley frame, the belt running over an idler pulley 36. Drive pulley 35 has a square center hub through which passes a horizontal shaft 37. Shaft 37 is coupled to and extends from the output shaft of a turntable drive motor 38 located in the housing of hoist 19 to a bearing 39 mounted on a bracket in the far end of arm 20. Thus when motor 38 operates, it acts through shaft 37 and pulley 35 to drive the turntable in a direction and to an extent determined by the instructions given to this motor by the computer, thereby angling loop 21 accordingly.

A coding disc 43 mounted on the output shaft of motor 38 operates in conjunction with a fixed sensor 44 to indicate the position of the turntable driven by the motor in a manner similar to encoder strip 29.

Elevator motor 41 which acts to raise or lower hoist 19, rail motor 42 which drives robot 16 along the longitudinal axis, trolley motor 23 which shifts trolley 23 fore and aft along the transverse axis, and turntable motor 38 which angles the loop carrying the hand 22, are all under the supervision and control of a programmable microcomputer 45 and a power supply 44 which supplies power to the motor in accordance with computer commands. These may be mounted on the console or work bench, or, as shown, may be placed at a remote location and linked to the motors by extension cables.

Thus if in a given procedure, the work basket must first be immersed in tank A for five minutes, followed by sequential immersion in tanks B and C for eight minutes, after which the basket is immersed in tank D for ten minutes, and the basket is to occupy particular positions in the tanks, the program set up for this treatment is such as to cause the motors to make the number of revolutions or fractions thereof necessary to exactly execute the desire program. The program may also take into account process variables, such as fluctuations in the temperature of the bath within a tank which may be sensed to vary the dwell period. In practice, the computer may be provided with program cards to supply the necessary instructions for different predetermined programs or modifying existing programs.

Figure 6:
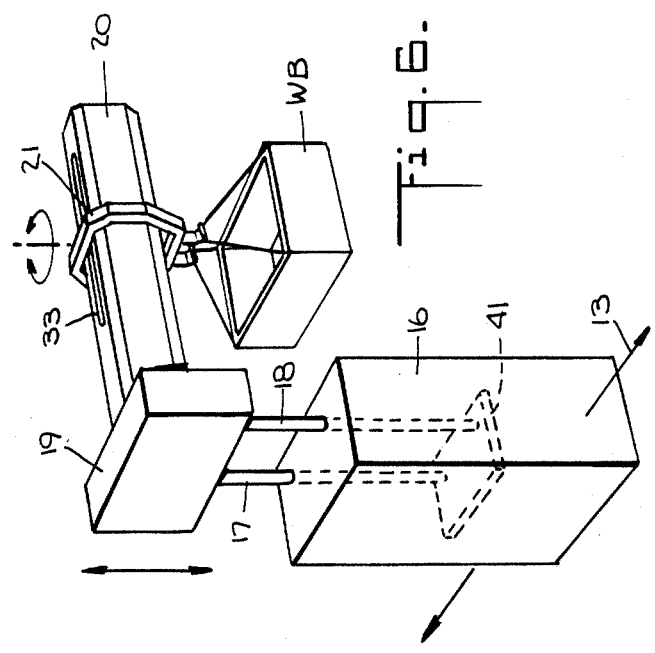
FIG. 6 schematically illustrates the motions executed by the robot in orienting the work basket.

As shown in FIG. 6, when robot 16 is instructed by the computer to transfer a work basket from one processing tank in which it is immersed to another tank, hoist 19 is raised by elevator platform 40 to lift the work basket WB from the tank. Then the robot is advanced to the left or right on rail 13, depending on where the next tank is, to a position generally in line with that tank, which in practice may be nearer or farther on the work bench in the transverse direction from the previous tank.

In order, therefore, to make the necessary fore and aft adjustment, trolley 23 is shifted to a position in line with the tank. And to properly orient the basket with respect to the tank, hand 22 is rotated by the turntable to a position effecting the desired orientation.

While there has been shown and described a preferred embodiment of AUTOMATED WORK TRANSFER SYSTEM FOR CHEMICAL PRO- CESSING BATHS in accordance with the invention, it will be appreciated that many changes and modifications may be made therein without, however, departing from the essential spirit thereof.

Thus, a system in accordance with the invention, though capable of operation in conjunction with a work bench having processing tanks randomly disposed thereon, is not limited to this application, for the system is also operable with tanks in a uniform row all having the same orientation.

I claim:

1. A work transfer system for conveying a work basket having a handle to a plurality of processing tanks so dispersed on a work bench that not all tanks are displaced the same transverse distance from the front of the bench, nor are all tanks oriented in the same manner; said system comprising:
    (A) a robot riding on a rail parallel to the front of the bench;
    (B) a hoist mounted above the robot, said hoist being raisable or lowerable relative to the robot;
    (C) a hollow arm cantilevered from the hoist along a transverse axis across the bench;
    (D) a trolley riding within the arm and provided with a turntable having a spindle projecting upwardly therefrom;
    (E) a loop encircling the arm, the upper end of the loop being joined to the spindle whereby the loop is caused to assume an angular position relative to the arm in accordance with the turntable position;
    (F) a hand joined to the lower end of the loop to hold the work basket;
    (G) a rail motor in the robot to drive the robot on the rail to cause it to assume a position bringing the hoist in proximity to a selected tank;
    (H) an elevator motor in said robot to operate the hoist to raise or lower the basket relative to the selected tank;
    (I) a trolley motor to shift the position of the trolley in the arm to bring the hand in line with the selected tank therebelow; and
    (J) a turntable motor to angle the loop and the hand thereunder so as to properly orient the basket with respect to the selected tank.

2. A system as set forth in claim 1, further including a computer coupled to said motors and programmed to effect automatic transfer of the work basket to the tanks in a predetermined sequence.

3. A system as set forth in claim 1, wherein said arm is provided with an outer skin having a longitudinal slot therein through which said spindle extends.

4. A system as set forth in claim 1, wherein said trolley in said arm is coupled to said trolley motor by a sprocket chain.

5. A system as set forth in claim 1, wherein said turntable is driven by said turntable motor through an endless belt mounted on a drive pulley having a square hub hole through which extends a shaft having a square cross section, the shaft being coupled to said turntable motor.

6. A system as set forth in claim 1, further including an encoder strip mounted on the trolley to move with respect to a fixed sensor, producing a pulse count indicative of the position of the trolley in said arm, said count being applied to means to control the trolley motor.

7. A system as set forth in claim 1, further including a coding disc mounted on the shaft of the turntable motor which turns with respect to a fixed sensor to produce a pulse count indicative of the position of the turntable, said count being applied to means to control the trolley motor.

8. A system as set forth in claim 1, wherein said arm has a thin cross section to minimize air turbulence in a clean air laminar environment over the work bench.

9. A system as set forth in claim 1, wherein said turntable motor and said trolley motor are located in said hoist and are linked, respectively, to the turntable and the trolley in the arm.

10. A work transfer system for conveying a work basket to a plurality of processing tanks disposed along a work bench, said system comprising:
    (A) a robot riding on a rail parallel to the front of the bench, said robot having a hoist which is raisable or lowerable relative to the work bench;
    (B) a hollow arm cantilevered from the hoist along a transverse axis across the bench;
    (C) a driven trolley riding within the arm and provided with a driven turntable having a spindle projecting upwardly therefrom; and
    (D) a loop encircling the arm, the upper end of the loop being joined to the spindle whereby the loop is caused to assume an angular position relative to the arm in accordance with the turntable position, the lower end of the loop being coupled to the work basket.

* * * * *